US008599768B2

(12) United States Patent
Wang et al.

(10) Patent No.: US 8,599,768 B2
(45) Date of Patent: Dec. 3, 2013

(54) DISTRIBUTING GROUP SIZE INDICATIONS TO MOBILE STATIONS

(75) Inventors: Ping Wang, Beijing (CN); Yi Hsuan, Sunnyvale, CA (US); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 406 days.

(21) Appl. No.: 12/636,892

(22) Filed: Dec. 14, 2009

(65) Prior Publication Data

US 2011/0044265 A1 Feb. 24, 2011

Related U.S. Application Data

(60) Provisional application No. 61/275,266, filed on Aug. 24, 2009.

(51) Int. Cl.
*H04W 4/00* (2009.01)
(52) U.S. Cl.
USPC .......................... 370/329; 370/252; 455/450
(58) Field of Classification Search
USPC .................... 370/252–253, 312, 328–339; 455/450–460, 69–72
See application file for complete search history.

(56) References Cited

U.S. PATENT DOCUMENTS

| 2011/0003553 A1* | 1/2011 | Kim et al. ............... 455/63.1 |
| 2012/0009934 A1* | 1/2012 | Kim et al. ............... 455/450 |

FOREIGN PATENT DOCUMENTS

| KR | 10-2005-0087947 | 9/2005 |
| WO | WO 2009/045080 | 4/2009 |

OTHER PUBLICATIONS

International Search Report with Written Opinion of the International Searching Authority mailed Apr. 27, 2011 in international application No. PCT/US/2010/046469 (8 pages).
Wang, F., et al. WiMax Oveview and System Performance, Advanced Radio Technology, Motorola, Inc , IEEE, May 2006.

* cited by examiner

*Primary Examiner* — Ricky Ngo
*Assistant Examiner* — Iqbal Zaidi
(74) *Attorney, Agent, or Firm* — Trop, Pruner & Hu, P.C.

(57) ABSTRACT

Group size indications may be distributed from a base station to a mobile station in the form of assignment-advanced-MAP transmit control signaling. The signaling control information may be sent to a station, such as a mobile station, using a table that indicates the size of a group based on coding rates, such as one-half and one-quarter coding rates. Waste may be controlled by determining a size based on using an unoccupied resource in a group that is adjacent to data resource for data transmission by the station. However, an unoccupied resource in a group that is not adjacent to a data resource is not used for data transmission and is, therefore, wasted.

16 Claims, 2 Drawing Sheets

DISTRIBUTING GROUP SIZE INDICATIONS TO MOBILE STATIONS

CROSS-REFERENCE TO RELATED APPLICATIONS

This application claims priority to provisional application 61/275,266, filed Aug. 24, 2009, which provisional application is hereby expressly incorporated herein.

BACKGROUND

This relates generally to wireless communications between base stations and mobile stations.

An assignment-advanced-MAP (A-A-MAP) is used to transmit control signaling, such as resource allocation, hybrid automatic repeat request (HARQ), and the like for data transmission from a base station to a mobile station. The A-A-MAP can be encoded by different coding rates. For example, one-half, one-quarter, or one-eighth coding rates can use different A-MAP Logical Resource Unit (MLRU) sizes, respectively.

As a result, A-A-MAPs can be partitioned into different groups with different MLRU sizes. For example, a group one may be used for the one-half rate, group two for the one-quarter rate, and the group three for the one-eighth rate. So each group can have the multiple of MLRU sizes used by the different mobile stations, which is called the group size for each group. For example, the group size one for group one can be 10 MLRUs.

DETAILED DESCRIPTION

Figure 1:
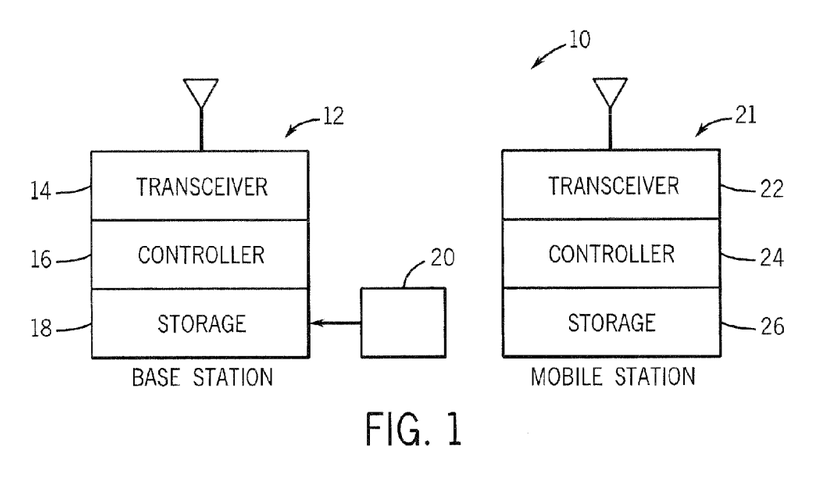
FIG. 1 is an architectural depiction of one embodiment.

Referring to FIG. 1, a wireless system 10 may be an orthogonal frequency division multiple access (OFDMA) communication system in accordance with one embodiment. A base station 12 may be an advanced base station (ABS) that signals the A-A-MAP group size in a non-user specific advanced map (A-MAP) information element (IE) to an advanced mobile station (AMS) 21. Then the advanced mobile station 21 can blind detect its A-MAP signaling according to the received A-A-MAP group size in a non-user specific A-MAP IE from the advanced base station 12.

The base station 12 includes a wireless transceiver 14. The transceiver 14 is coupled to a controller 16, such as a processor or a microcontroller. Also coupled to the controller is a storage 18. The storage may be a semiconductor memory, as one example. The storage 18 may store a sequence of instructions 20 in some embodiments.

The mobile station 21 is adapted to communicate wirelessly with the base station. The mobile station, too, may include a transceiver 22, coupled to a controller 24. The controller 24, in turn, may be coupled to a storage 26.

Some embodiments may relate to the OFDMA wireless communications standard IEEE 802.16m. See P 802.16 m/D1 Advanced Air Interface (Draft 1), Jul. 31, 2009, available from IEEE, New York, N.Y. 10016. In this proposed standard, information is modulated and transmitted on a number of orthogonal sub-carriers that span the system bandwidth. An advanced base station 12 can signal the control information, such as resource units, HARQ, and the like to the advanced mobile station 21 in A-A-MAP IEs, where the A-A-MAP IE is a separate or group based encoding, broadcast to all advanced mobile stations.

Quadrature phase shift keying (QPSK) one-half, one-quarter coding rates {½, ¼} or QPSK {½, ⅛} are accepted as A-A-MAP modulation and coding scheme (MCS) sets in IEEE 802.16m. A-A-MAPs are grouped together based on the MCS and A-A-MAP IE size. The size of each A-A-MAP group may be indicated in a non-user specific A-MAP IE to facilitate AMS A-A-MAP blind detection.

The A-A-MAP group size indication table may be generated in non-user specific A-MAP IE using the following design considerations in some embodiments. One A-A-MAP IE size is supported. A single table may be used for all system bandwidths, given an MCS set and fractional frequency reuse (FFR) configuration. The maximum number of MLRUs used for A-A-MAP is 48 per subframe, which is at most 29.17% [=(48*56/96)/96] of subframe resource at 20 MHz bandwidth. It is noted that each MLRU has the 56 subcarriers and that the maximum number of LRUs is 96 at 20 MHz bandwidth. The maximum number of total A-A-MAP IEs is limited to 32 for all the cases.

Four A-A-MAP group size indication tables are used, in one embodiment, as explained in the following. When QPSK {½, ¼} is used in the non-FFR case, called case 1, two A-A-MAP groups are used. The minimum resource unit in each group is 1 MLRU and 2 MLRUs, respectively (i.e. [1, 2] MLRUs). When QPSK {½, ⅛} is used in the non-FFR case, called case 2, two A-A-MAP groups are used. The minimum resource unit in each group is 1 MLRU and 4 MLRUs, respectively (i.e. [1, 4] MLRUs). In case 3, using FFR, when QPSK {½} is used for the FFR reuse of 3 A-A-MAP groups and QPSK {½, ¼} is used for the reuse of 1 A-A-MAP group, three A-A-MAP groups are used. The minimum resource unit in each group is 1, 1, and 2 MLRUs, respectively (i.e. [1, 1, 2] MLRUs). In case 4, using FFR, when QPSK {½} is used for the FFR reuse of 3 A-A-MAP groups and QPSK {½, ⅛} is used for the reuse of 1 A-A-MAP group, three A-A-MAP groups are used. The minimum resource unit in each group is 1, 1, and 4 MLRUs, respectively (i.e. [1, 1, 4] MLRUs).

Eight-bit lookup tables may be used for the A-A-MAP group size indication so that the non-user specific signaling overhead is within reasonable range in one embodiment. However, to achieve this goal, some group size combinations may be removed. The following two considerations may be taken into account in the process of group size combination removal in some embodiments. The first consideration is that an unoccupied resource in the A-A-MAP group that is adjacent to data resource may be used for the data transmission by an ABS. Therefore there is no resource waste but extra blind detections are required.

Figure 3:
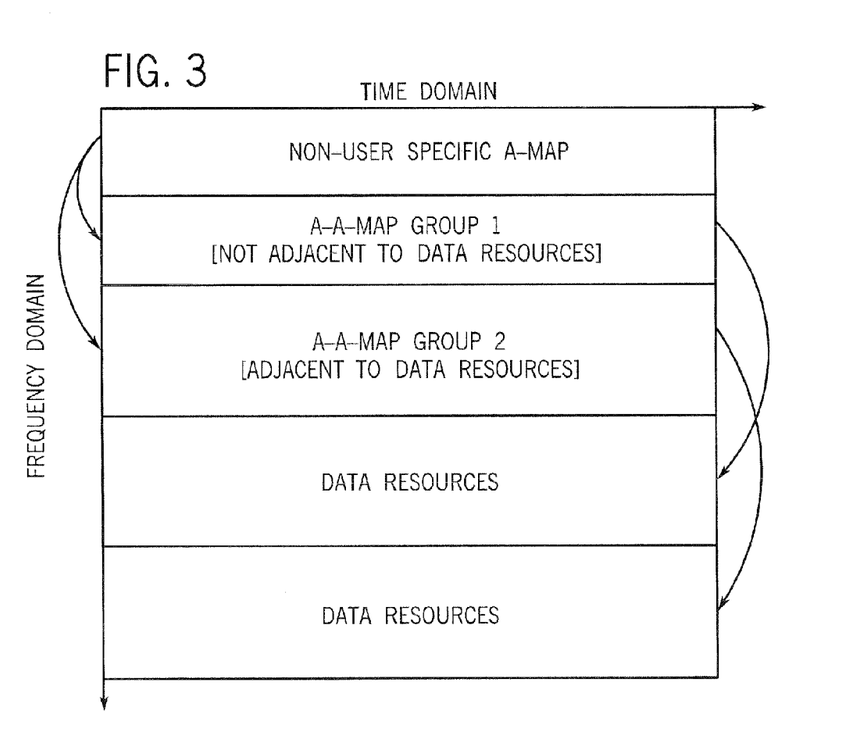
FIG. 3 is a graph of time domain versus frequency domain for a non-user specific A-MAP according to one embodiment.

Referring to FIG. 3, plotting time versus frequency domain, the A-A-MAP Group 1 is not adjacent in the frequency domain to the data resources, but A-A-MAP Group 2 is adjacent in the frequency domain to the data resources. The second consideration is that unoccupied resource in the A-A-MAP group that is not adjacent to the data resource cannot be used for data transmission and is therefore wasted. The design advantageously minimizes resource waste for system efficiency in some embodiments.

The A-A-MAP group with more robust MCS may be placed before the A-A-MAP group with less robust MCS in some embodiments. The exact size of the group with more robust MCS may be signaled when possible to minimize resource waste. The reason is as follows. Because each IR using more robust MCS takes more resource, the maximal group size of the more robust MCS is smaller given a fixed resource. Therefore it takes less signaling overhead to signal the exact size of A-A-MAP group using the more robust MCS. On the other hand, the group of less robust MCS contributes to more size combinations. Many combinations can be removed if the exact size of the group is not signaled using less robust MCS. Moreover because the less robust group follows the more robust group and is adjacent to a data resource, combination removal does not transfer to resource waste.

Table 1 lists the number of possible group size combinations and number of bits to signal each combination, assuming that the total number of MLRUs for A-A-MAP is 12, 24, and 48 for 5, 10 (7 and 8.75 MHz), 20 MHz system bandwidth respectively. The signaling overhead of the A-A-MAP group size indication can be as large as 14 bits for the unconstrained A-A-MAP resource indication. So removal of some combinations is desirable in order to reduce the signaling overhead of A-A-MAP resource indication.

larger than the requirement of 8-bit signaling overhead. The following is the second combination removing operation. The combinations of MLRUs no larger than 24 may be retained by considering the 5, 7, 8.75, and 10 MHz bandwidths, which are about 169. Some combinations of MLRUs from 25 to 48 may be removed by two steps in one embodiment. First, limiting the maximum number of IEs no more than 32, then the number of remaining combinations is reduced to 320, which is still larger than 87 (=256−169). Second, the above 320 combinations shall be further reduced to 87.

$$\Delta=320/[(320-(256-169)]=1.3734$$

where $\Delta$ is the removing step. From the new index 1, combinations are uniformly removed every $\Delta$ combinations. The following are the combination indices to be removed: [1,2,4,5,6,8,9,10,12,13,15,16,17,19,20,21,23,24,26,27,28, 30,31,32,34,35,37,38,39,41,42, 43,45,46,48,49,50,52,53,54, 56,57,59,60,61,63,64,65,67,68,70,71,72,74,75,76,78,79,81, 82,83,85,86,87,89,90,92,93,94,96,97,98,100,101,103,104, 105,107,108,109,111,112,113,115,116,118,119,120,122,

TABLE 1

Signaling Overhead of Unconstrained A-A-MAP Resource Indication

| Bandwidth | 5 MHz | 7, 8.75, and 10 MHz | 20 MHz |
|---|---|---|---|
| Number of MLRUs used by A-A-MAP | 12 | 24 | 48 |
| Number of Combinations using QPSK (1/2, 1/4) for non-FFR A-A-MAP (CASE 1) | 49 (ceil(log$_2$(49)) = 6 bits) | 169 (ceil(log$_2$(169)) = 8 bits) | 625 (ceil(log$_2$(625)) = 10 bits) |
| Number of Combinations using QPSK (1/2, 1/8) for non-FFR A-A-MAP (CASE 2) | 28 (ceil(log$_2$(28)) = 5 bits) | 91 (ceil(log$_2$(91)) = 7 bits) | 325 (ceil(log$_2$(325)) = 9 bits) |
| Number of Combinations using QPSK 1/2 for FFR Reuse 3 A-A-MAP and (1/2, 1/8) for Reuse 1 A-A-MAP (CASE 3) | 152 (ceil(log$_2$(152)) = 8 bits) | 861 (ceil(log$_2$(861)) = 10 bits) | 5681 (ceil(log$_2$(5681)) = 13 bits) |
| Number of Combinations using QPSK (1/2 for Reuse 3 A-A-MAP and (1/2, 1/4) for Reuse 1 A-A-MAP (Case 4) | 252 (ceil(log$_2$(252)) = 8 bits) | 1547 (ceil(log$_2$(1527)) = 12 bits) | 10725 (ceil(log$_2$(10725)) = 14 bits) |

In order to reduce the signaling overhead of the A-A-MAP group size indication in non-user specific A-MAP IE, some constraints may be made in some embodiments. Only 8-bit signaling overhead is used for the A-A-MAP resource allocation indication in the non-user specific A-MAP IE, which means that some combinations of MLRUs for A-A-MAP have to be removed. Unoccupied resource not adjacent to the data transmission in the A-A-MAP region is wasted. Unoccupied resource in the A-A-MAP group that is adjacent to data resource may be used for the data transmission by an ABS.

In the following discussion, four cases are described according to one embodiment. Cases 1 and 2 are non-FFR cases and cases 3 and 4 are FFR cases.

For case 1, with a non-FFR A-A-MAP that uses QPSK {½, ¼}, the resource allocation indication for A-A-MAP to meet to reduce resource waste may be as follows:

$$N_{total}=(2*N_1+N_2)\leq 48$$

wherein $N_{total}$ ($0\leq N_{total}\leq 48$) is the total number of MLRUs for A-A-MAP; $N_1$ ($0\leq N_1\leq 24$) is the number of A-A-MAPs in Group 1 using QPSK ¼; $N_2$ ($0\leq N_2\leq 48$) is the number of A-A-MAPs in Group 2 using QPSK ½. A first rule to reduce waste is that $N_1$ may be granularities from 0 to 24 MLRUs [0:1:24] (in other words, there are no granularities between 0 to 24 MLRUs to be removed) and $N_2$ may be [0:1:48]. The total number of remaining combinations is 625, which is still 123,124,126,127,129,130,131,133,134,135,137,138,140, 141,142,144,145,146,148,149,151,152,153,155,156,157, 159,160,162,163,164,166,167,168,170,171,173,174,175, 177,178,179,181,182,184,185,186,188,189,190,192,193, 195,196,197,199,200,201,203,204,206,207,208,210,211, 212,214,215,216,218,219,221,222,223,225,226,227,229, 230,232,233,234,236,237,238,240,241,243,244,245,247, 248,249,251,252,254,255,256,258,259,260,262,263,265, 266,267,269,270,271,273,274,276,277,278,280,281,282, 284,285,287,288,289,291,292,293,295,296,298,299,300, 302,303,304,306,307,309,310,311,313,314,315,317,318, 319].

For case 2, with a non-FFR A-A-MAP that uses QPSK {½, ⅛}, generating the resource allocation indication for A-A-MAP to reduce resource waste may then be:

$$N_{total}=(4*N_1+N_2)\leq 48$$

wherein $N_{total}$ ($0\leq N_{total}\leq 48$) is the total number of MLRUs for A-A-MAP; $N_1$ ($0\leq N_1\leq 12$) is the number of A-A-MAP in Group 1 using QPSK {⅛}; $N_2$ ($0\leq N_2\leq 48$) is the number of A-A-MAP in Group 2 using QPSK {½}.

Group 1 is not adjacent to data transmission and Group 2 is adjacent to data transmission. Therefore unoccupied MLRUs in Group 1 are wasted. In order to reduce the waste as much as possible, the first rule is applied to remove the combinations by making $N_1$ [0:1:12] and $N_2$ [0:1:48]. The total number of remaining combinations is reduced to 325, which is still larger than the requirement of 8-bit signaling overhead.

The following is the second combination removing operation. The combinations of MLRUs no larger than 24 shall be retained by considering the 5, 7, 8.75, and 10 MHz bandwidths, which are about 91.

Some combinations of MLRUs from 25 to 48 may be removed by two steps in some embodiments. First, limiting the maximum number of IEs no more than 32, then the number of remaining combinations is reduced to 183, which is still larger than 165 (=256−91). Second, the above 183 combinations shall be further reduced to 165:

$$\Delta=183/[183-(256-91)]=10.1667$$

wherein $\Delta$ is the removing step. From the new index 1, the combinations are uniformly removed every $\Delta$ combinations. The following are the combination indices to be removed: [10,20,30,40,50,61,71,81,91,101,111, 121,132,142,152,162, 172,182].

For case 3, with FFR reuse of 3 A-A-MAP groups using QPSK {½} and FFR reuse of 1 A-A-MAP group using QPSK {½, ⅛}, generating the resource allocation indication for A-A-MAP to reduce resource waste is as follows:

$$N_{total}=(4*N_1+N_2+N_3)\leq 48$$

wherein $N_{total}$ $(0\leq N_{total}\leq 48)$ is the total number of MLRUs for A-A-MAP; $N_1$ $(0\leq N_1\leq 12)$ is the number of FFR Reuse 1 A-A-MAP in Group 1 using QPSK ⅛; $N_2$ $(0\leq N_2\leq 48)$ is the number of FFR Reuse 1 A-A-MAP in Group 2 using QPSK ½; $N_3$ $(0\leq N_3\leq 48)$ is the number of FFR Reuse 3 A-A-MAP in Group 3 using QPSK ½.

Group 1 is not adjacent to data transmission in FFR Reuse 1, Group 2 is adjacent to data transmission in FFR Reuse 1, and Group 3 is adjacent to data transmission in FFR Reuse 3. Therefore unoccupied MLRUs in Group 1 are wasted. In order to reduce the waste as much as possible, the following rules are applied to remove the combinations first: $N_1$ may be [0:1:12]; $N_2$ may be [0:4:48]; $N_3$ may be [0:4:48]. The total number of the remaining combinations is reduced to 455, which is still larger than the requirement of 8-bit signaling overhead.

The following is the second combination removing operation. The combinations of MLRUs no larger than 24 may be retained by considering the 5, 7, 8.75, and 10 MHz bandwidths, which are about 84. Some combinations of MLRUs from 25 to 48 may be removed by two steps in one embodiment. First, limiting the maximum number of IEs no more than 32, then the number of remaining combinations is reduced to 217, which is still larger than 172 (=256−84). Second, the above 217 combinations may be further reduced to 172:

$$\Delta=217/[217-(256-84)]=4.8222$$

wherein $\Delta$ is the removing step. From the new index 1, the combinations are uniformly removed every $\Delta$ combinations. The following are the combination indices to be removed: [4,9,14,19,24,28,33,38,43,48,53,57,62,67,72,77,81,86,91, 96,101,106,110,115,120,125,130,135,139,144,149,154, 159, 163,168,173,178,183,188,192,197,202,207,212,216].

For case 4, with FFR reuse of 3 A-A-MAP groups, using QPSK {½} and for reuse of 1 A-A-MAP group using QPSK (½, ¼}, the resource allocation indication for A-A-MAP to reduce resource waste may be:

$$N_{total}=(2*N_1+N_2+N_3)\leq 48$$

wherein $N_{total}$ $(0\leq N_{total}\leq 48)$ is the total number of MLRUs for A-A-M; $N_1$ $(0\leq N_1\leq 24)$ is the number of FFR A-A-MAP Reuse 1 in Group 1 using QPSK ¼; $N_2$ $(0\leq N_2\leq 48)$ is the number of FFR A-A-MAP Reuse 1 in Group 2 using QPSK ½; $N_3$ $(0\leq N_3\leq 48)$ is the number of FFR A-A-MAP Reuse 3 in Group 3 using QPSK ½.

Group 1 is not adjacent to the data transmission in FFR Reuse 1, and Group 2 is adjacent to the data transmission in FFR reuse 1, Group 3 is adjacent to data transmission in FFR Reuse 3. Therefore unoccupied MLRUs in Group 1 are wasted. In order to reduce the waste as much as possible, the following rules are applied to remove the combinations first: $N_1$ may be [0:1:24]; $N_2$ may be [0:5:48]; $N_3$ may be [0:5:48]. The total number of remaining combination is reduced to 535, which is still larger than the requirement of 8-bit signaling overhead. The following is the second combination removing operation.

The combinations of MLRUs no larger than 24 may be retained by considering the 5, 7, 8.75, and 10 MHz bandwidths, which are about 92. Some combinations of MLRUs from 25 to 48 may be removed by two steps in one embodiment. First, limiting the maximum number of IEs no more than 32, then the number of remaining combinations is reduced to 239, which is still larger than 164 (=256−92). Second, the above 239 combinations may be further reduced to 164:

$$\Delta=239/[239-(256-92)]=3.1867$$

wherein $\Delta$ is the removing step. From the new index 1, the combinations are uniformly removed every $\Delta$ combinations. The following are the combination indices to be removed:

[3,6,9,12,15,19,22,25,28,31,35,38,41,44,47,50,54,57,60, 63,66,70,73,76,79,82,86,89,92, 95,98,101,105,108,111,114, 117,121,124,127,130,133,137,140,143,146,149,152,156, 159,162,165,168,172,175,178,181,184,188,191,194,197, 200,203,207,210,213,216,219,223, 226,229,232,235,238].

The A-A-MAP resource allocation indication in non-user specific A-MAP IE has already achieved by removing some combinations of A-A-MAP resource allocations, which can be tabulated as follows:

non-FFR Group 1 using QPSK {¼}, and Group 2 using QPSK {½};

non-FFR Group 1 using QPSK {⅛}, and Group 2 using QPSK {½};

FFR Group 1 using QPSK {⅛}, Group 2 using QPSK {½}, and Group 3 using QPSK {½};

FFR Group 1 using QPSK {¼}, Group 2 using QPSK {½}, and Group 3 using QPSK {½}.

Assignment A-MAPs in each assignment A-MAP group are signaled through non-user specific A-MAP. If two assignment A-MAP groups using two MCS levels are present in a A-MAP region, assignment A-MAP group using more robust MCS is allocated first, followed by assignment A-MAP group using less robust MCS.

Tables 2, 3, 4, and 5 below show indices for the number of the assignment A-MAPs in each assignment A-MAP group. Each table is used for a particular assignment A-MAP MCS set and FFR configuration. The actual number of assignment A-MAPs in each assignment A-MAP group can be equal or less than the number indicated by index from Table 2 to 5, respectively.

TABLE 2

The number of Assignment A-MAPs in each assignment A-MAP group for non-FFR configuration. Group 1 uses QPSK ¼ and Group 2 uses QPSK ½

| Index | Assignment A-MAP Group 1 Using QPSK ¼ | Assignment A-MAP Group 2 Using QPSK ½ |
|---|---|---|
| 0 | 0 | 0 |
| 1 | 0 | 1 |
| 2 | 0 | 2 |
| 3 | 1 | 0 |
| 4 | 0 | 3 |
| 5 | 1 | 1 |
| 6 | 0 | 4 |
| 7 | 1 | 2 |
| 8 | 2 | 0 |
| 9 | 0 | 5 |
| 10 | 1 | 3 |
| 11 | 2 | 1 |
| 12 | 0 | 6 |
| 13 | 1 | 4 |
| 14 | 2 | 2 |
| 15 | 3 | 0 |
| 16 | 0 | 7 |
| 17 | 1 | 5 |
| 18 | 2 | 3 |
| 19 | 3 | 1 |
| 20 | 0 | 8 |
| 21 | 1 | 6 |
| 22 | 2 | 4 |
| 23 | 3 | 2 |
| 24 | 4 | 0 |
| 25 | 0 | 9 |
| 26 | 1 | 7 |
| 27 | 2 | 5 |
| 28 | 3 | 3 |
| 29 | 4 | 1 |
| 30 | 0 | 10 |
| 31 | 1 | 8 |
| 32 | 2 | 6 |
| 33 | 3 | 4 |
| 34 | 4 | 2 |
| 35 | 5 | 0 |
| 36 | 0 | 11 |
| 37 | 1 | 9 |
| 38 | 2 | 7 |
| 39 | 3 | 5 |
| 40 | 4 | 3 |
| 41 | 5 | 1 |
| 42 | 0 | 12 |
| 43 | 1 | 10 |
| 44 | 2 | 8 |
| 45 | 3 | 6 |
| 46 | 4 | 4 |
| 47 | 5 | 2 |
| 48 | 6 | 0 |
| 49 | 0 | 13 |
| 50 | 1 | 11 |
| 51 | 2 | 9 |
| 52 | 3 | 7 |
| 53 | 4 | 5 |
| 54 | 5 | 3 |
| 55 | 6 | 1 |
| 56 | 0 | 14 |
| 57 | 1 | 12 |
| 58 | 2 | 10 |
| 59 | 3 | 8 |
| 60 | 4 | 6 |
| 61 | 5 | 4 |
| 62 | 6 | 2 |
| 63 | 7 | 0 |
| 64 | 0 | 15 |
| 65 | 1 | 13 |
| 66 | 2 | 11 |
| 67 | 3 | 9 |
| 68 | 4 | 7 |
| 69 | 5 | 5 |
| 70 | 6 | 3 |
| 71 | 7 | 1 |
| 72 | 0 | 16 |
| 73 | 1 | 14 |
| 74 | 2 | 12 |
| 75 | 3 | 10 |
| 76 | 4 | 8 |
| 77 | 5 | 6 |
| 78 | 6 | 4 |
| 79 | 7 | 2 |
| 80 | 8 | 0 |
| 81 | 0 | 17 |
| 82 | 1 | 15 |
| 83 | 2 | 13 |
| 84 | 3 | 11 |
| 85 | 4 | 9 |
| 86 | 5 | 7 |
| 87 | 6 | 5 |
| 88 | 7 | 3 |
| 89 | 8 | 1 |
| 90 | 0 | 18 |
| 91 | 1 | 16 |
| 92 | 2 | 14 |
| 93 | 3 | 12 |
| 94 | 4 | 10 |
| 95 | 5 | 8 |
| 96 | 6 | 6 |
| 97 | 7 | 4 |
| 98 | 8 | 2 |
| 99 | 9 | 0 |
| 100 | 0 | 19 |
| 101 | 1 | 17 |
| 102 | 2 | 15 |
| 103 | 3 | 13 |
| 104 | 4 | 11 |
| 105 | 5 | 9 |
| 106 | 6 | 7 |
| 107 | 7 | 5 |
| 108 | 8 | 3 |
| 109 | 9 | 1 |
| 110 | 0 | 20 |
| 111 | 1 | 18 |
| 112 | 2 | 16 |
| 113 | 3 | 14 |
| 114 | 4 | 12 |
| 115 | 5 | 10 |
| 116 | 6 | 8 |
| 117 | 7 | 6 |
| 118 | 8 | 4 |
| 119 | 9 | 2 |
| 120 | 10 | 0 |
| 121 | 0 | 21 |
| 122 | 1 | 19 |
| 123 | 2 | 17 |
| 124 | 3 | 15 |
| 125 | 4 | 13 |
| 126 | 5 | 11 |
| 127 | 6 | 9 |
| 128 | 7 | 7 |
| 129 | 8 | 5 |
| 130 | 9 | 3 |
| 131 | 10 | 1 |
| 132 | 0 | 22 |
| 133 | 1 | 20 |
| 134 | 2 | 18 |
| 135 | 3 | 16 |
| 136 | 4 | 14 |
| 137 | 5 | 12 |
| 138 | 6 | 10 |
| 139 | 7 | 8 |

TABLE 2-continued

The number of Assignment A-MAPs in each assignment A-MAP group for non-FFR configuration.
Group 1 uses QPSK ¼ and Group 2 uses QPSK ½

| Index | Assignment A-MAP Group 1 Using QPSK ¼ | Assignment A-MAP Group 2 Using QPSK ½ |
|---|---|---|
| 140 | 8 | 6 |
| 141 | 9 | 4 |
| 142 | 10 | 2 |
| 143 | 11 | 0 |
| 144 | 0 | 23 |
| 145 | 1 | 21 |
| 146 | 2 | 19 |
| 147 | 3 | 17 |
| 148 | 4 | 15 |
| 149 | 5 | 13 |
| 150 | 6 | 11 |
| 151 | 7 | 9 |
| 152 | 8 | 7 |
| 153 | 9 | 5 |
| 154 | 10 | 3 |
| 155 | 11 | 1 |
| 156 | 0 | 24 |
| 157 | 1 | 22 |
| 158 | 2 | 20 |
| 159 | 3 | 18 |
| 160 | 4 | 16 |
| 161 | 5 | 14 |
| 162 | 6 | 12 |
| 163 | 7 | 10 |
| 164 | 8 | 8 |
| 165 | 9 | 6 |
| 166 | 10 | 4 |
| 167 | 11 | 2 |
| 168 | 12 | 0 |
| 169 | 2 | 21 |
| 170 | 6 | 13 |
| 171 | 10 | 5 |
| 172 | 0 | 26 |
| 173 | 4 | 18 |
| 174 | 8 | 10 |
| 175 | 11 | 4 |
| 176 | 1 | 25 |
| 177 | 5 | 17 |
| 178 | 8 | 11 |
| 179 | 12 | 3 |
| 180 | 2 | 24 |
| 181 | 5 | 18 |
| 182 | 9 | 10 |
| 183 | 13 | 2 |
| 184 | 1 | 27 |
| 185 | 5 | 19 |
| 186 | 9 | 11 |
| 187 | 12 | 5 |
| 188 | 1 | 28 |
| 189 | 5 | 20 |
| 190 | 8 | 14 |
| 191 | 12 | 6 |
| 192 | 0 | 31 |
| 193 | 3 | 25 |
| 194 | 7 | 17 |
| 195 | 11 | 9 |
| 196 | 14 | 3 |
| 197 | 2 | 28 |
| 198 | 6 | 20 |
| 199 | 10 | 12 |
| 200 | 13 | 6 |
| 201 | 1 | 31 |
| 202 | 5 | 23 |
| 203 | 8 | 17 |
| 204 | 12 | 9 |
| 205 | 16 | 1 |
| 206 | 4 | 26 |
| 207 | 8 | 18 |
| 208 | 12 | 10 |
| 209 | 15 | 4 |
| 210 | 4 | 27 |
| 211 | 8 | 19 |
| 212 | 11 | 13 |
| 213 | 15 | 5 |
| 214 | 5 | 26 |
| 215 | 8 | 20 |
| 216 | 12 | 12 |
| 217 | 16 | 4 |
| 218 | 5 | 27 |
| 219 | 9 | 19 |
| 220 | 13 | 11 |
| 221 | 16 | 5 |
| 222 | 7 | 24 |
| 223 | 11 | 16 |
| 224 | 14 | 10 |
| 225 | 18 | 2 |
| 226 | 9 | 21 |
| 227 | 13 | 13 |
| 228 | 16 | 7 |
| 229 | 8 | 24 |
| 230 | 12 | 16 |
| 231 | 15 | 10 |
| 232 | 19 | 2 |
| 233 | 11 | 19 |
| 234 | 14 | 13 |
| 235 | 18 | 5 |
| 236 | 11 | 20 |
| 237 | 14 | 14 |
| 238 | 18 | 6 |
| 239 | 11 | 21 |
| 240 | 14 | 15 |
| 241 | 18 | 7 |
| 242 | 12 | 20 |
| 243 | 15 | 14 |
| 244 | 19 | 6 |
| 245 | 13 | 19 |
| 246 | 16 | 13 |
| 247 | 20 | 5 |
| 248 | 15 | 16 |
| 249 | 18 | 10 |
| 250 | 22 | 2 |
| 251 | 17 | 13 |
| 252 | 20 | 7 |
| 253 | 16 | 16 |
| 254 | 20 | 8 |
| 255 | 24 | 0 |

TABLE 3

The number of assignment A-MAPs in each assignment A-MAP group for non-FFR configuration.
Group 1 uses QPSK ⅛ and Group 2 uses QPSK ½

| Index | Assignment A-MAP Group 1 Using QPSK ⅛ | Assignment A-MAP Group 2 Using QPSK ½ |
|---|---|---|
| 0 | 0 | 0 |
| 1 | 0 | 1 |
| 2 | 0 | 2 |
| 3 | 0 | 3 |
| 4 | 0 | 4 |
| 5 | 1 | 0 |
| 6 | 0 | 5 |
| 7 | 1 | 1 |

TABLE 3-continued

The number of assignment A-MAPs in each assignment A-MAP group for non-FFR configuration.
Group 1 uses QPSK 1/8 and Group 2 uses QPSK 1/2

| Index | Assignment A-MAP Group 1 Using QPSK 1/8 | Assignment A-MAP Group 2 Using QPSK 1/2 |
|---|---|---|
| 8 | 0 | 6 |
| 9 | 1 | 2 |
| 10 | 0 | 7 |
| 11 | 1 | 3 |
| 12 | 0 | 8 |
| 13 | 1 | 4 |
| 14 | 2 | 0 |
| 15 | 0 | 9 |
| 16 | 1 | 5 |
| 17 | 2 | 1 |
| 18 | 0 | 10 |
| 19 | 1 | 6 |
| 20 | 2 | 2 |
| 21 | 0 | 11 |
| 22 | 1 | 7 |
| 23 | 2 | 3 |
| 24 | 0 | 12 |
| 25 | 1 | 8 |
| 26 | 2 | 4 |
| 27 | 3 | 0 |
| 28 | 0 | 13 |
| 29 | 1 | 9 |
| 30 | 2 | 5 |
| 31 | 3 | 1 |
| 32 | 0 | 14 |
| 33 | 1 | 10 |
| 34 | 2 | 6 |
| 35 | 3 | 2 |
| 36 | 0 | 15 |
| 37 | 1 | 11 |
| 38 | 2 | 7 |
| 39 | 3 | 3 |
| 40 | 0 | 16 |
| 41 | 1 | 12 |
| 42 | 2 | 8 |
| 43 | 3 | 4 |
| 44 | 4 | 0 |
| 45 | 0 | 17 |
| 46 | 1 | 13 |
| 47 | 2 | 9 |
| 48 | 3 | 5 |
| 49 | 4 | 1 |
| 50 | 0 | 18 |
| 51 | 1 | 14 |
| 52 | 2 | 10 |
| 53 | 3 | 6 |
| 54 | 4 | 2 |
| 55 | 0 | 19 |
| 56 | 1 | 15 |
| 57 | 2 | 11 |
| 58 | 3 | 7 |
| 59 | 4 | 3 |
| 60 | 0 | 20 |
| 61 | 1 | 16 |
| 62 | 2 | 12 |
| 63 | 3 | 8 |
| 64 | 4 | 4 |
| 65 | 5 | 0 |
| 66 | 0 | 21 |
| 67 | 1 | 17 |
| 68 | 2 | 13 |
| 69 | 3 | 9 |
| 70 | 4 | 5 |
| 71 | 5 | 1 |
| 72 | 0 | 22 |
| 73 | 1 | 18 |
| 74 | 2 | 14 |
| 75 | 3 | 10 |
| 76 | 4 | 6 |
| 77 | 5 | 2 |
| 78 | 0 | 23 |
| 79 | 1 | 19 |
| 80 | 2 | 15 |
| 81 | 3 | 11 |
| 82 | 4 | 7 |
| 83 | 5 | 3 |
| 84 | 0 | 24 |
| 85 | 1 | 20 |
| 86 | 2 | 16 |
| 87 | 3 | 12 |
| 88 | 4 | 8 |
| 89 | 5 | 4 |
| 90 | 6 | 0 |
| 91 | 0 | 25 |
| 92 | 1 | 21 |
| 93 | 2 | 17 |
| 94 | 3 | 13 |
| 95 | 4 | 9 |
| 96 | 5 | 5 |
| 97 | 6 | 1 |
| 98 | 0 | 26 |
| 99 | 1 | 22 |
| 100 | 3 | 14 |
| 101 | 4 | 10 |
| 102 | 5 | 6 |
| 103 | 6 | 2 |
| 104 | 0 | 27 |
| 105 | 1 | 23 |
| 106 | 2 | 19 |
| 107 | 3 | 15 |
| 108 | 4 | 11 |
| 109 | 6 | 3 |
| 110 | 0 | 28 |
| 111 | 1 | 24 |
| 112 | 2 | 20 |
| 113 | 3 | 16 |
| 114 | 4 | 12 |
| 115 | 5 | 8 |
| 116 | 6 | 4 |
| 117 | 7 | 0 |
| 118 | 1 | 25 |
| 119 | 2 | 21 |
| 120 | 3 | 17 |
| 121 | 4 | 13 |
| 122 | 5 | 9 |
| 123 | 6 | 5 |
| 124 | 7 | 1 |
| 125 | 0 | 30 |
| 126 | 1 | 26 |
| 127 | 3 | 18 |
| 128 | 4 | 14 |
| 129 | 5 | 10 |
| 130 | 6 | 6 |
| 131 | 7 | 2 |
| 132 | 0 | 31 |
| 133 | 1 | 27 |
| 134 | 2 | 23 |
| 135 | 3 | 19 |
| 136 | 5 | 11 |
| 137 | 6 | 7 |
| 138 | 7 | 3 |
| 139 | 0 | 32 |
| 140 | 1 | 28 |
| 141 | 2 | 24 |
| 142 | 3 | 20 |
| 143 | 4 | 16 |
| 144 | 5 | 12 |
| 145 | 6 | 8 |
| 146 | 8 | 0 |
| 147 | 1 | 29 |

TABLE 3-continued

The number of assignment A-MAPs in each assignment
A-MAP group for non-FFR configuration.
Group 1 uses QPSK ⅛ and Group 2 uses QPSK ½

| Index | Assignment A-MAP Group 1 Using QPSK ⅛ | Assignment A-MAP Group 2 Using QPSK ½ |
|---|---|---|
| 148 | 2 | 25 |
| 149 | 3 | 21 |
| 150 | 4 | 17 |
| 151 | 5 | 13 |
| 152 | 6 | 9 |
| 153 | 7 | 5 |
| 154 | 8 | 1 |
| 155 | 2 | 26 |
| 156 | 3 | 22 |
| 157 | 4 | 18 |
| 158 | 5 | 14 |
| 159 | 6 | 10 |
| 160 | 7 | 6 |
| 161 | 8 | 2 |
| 162 | 1 | 31 |
| 163 | 2 | 27 |
| 164 | 4 | 19 |
| 165 | 5 | 15 |
| 166 | 6 | 11 |
| 167 | 7 | 7 |
| 168 | 8 | 3 |
| 169 | 2 | 28 |
| 170 | 3 | 24 |
| 171 | 4 | 20 |
| 172 | 5 | 16 |
| 173 | 7 | 8 |
| 174 | 8 | 4 |
| 175 | 9 | 0 |
| 176 | 2 | 29 |
| 177 | 3 | 25 |
| 178 | 4 | 21 |
| 179 | 5 | 17 |
| 180 | 6 | 13 |
| 181 | 7 | 9 |
| 182 | 9 | 1 |
| 183 | 2 | 30 |
| 184 | 3 | 26 |
| 185 | 4 | 22 |
| 186 | 5 | 18 |
| 187 | 6 | 14 |
| 188 | 7 | 10 |
| 189 | 8 | 6 |
| 190 | 9 | 2 |
| 191 | 4 | 23 |
| 192 | 5 | 19 |
| 193 | 6 | 15 |
| 194 | 7 | 11 |
| 195 | 8 | 7 |
| 196 | 9 | 3 |
| 197 | 3 | 28 |
| 198 | 4 | 24 |
| 199 | 5 | 20 |
| 200 | 7 | 12 |
| 201 | 8 | 8 |
| 202 | 9 | 4 |
| 203 | 10 | 0 |
| 204 | 3 | 29 |
| 205 | 4 | 25 |
| 206 | 5 | 21 |
| 207 | 6 | 17 |
| 208 | 7 | 13 |
| 209 | 8 | 9 |
| 210 | 10 | 1 |
| 211 | 4 | 26 |
| 212 | 5 | 22 |
| 213 | 6 | 18 |
| 214 | 7 | 14 |
| 215 | 8 | 10 |
| 216 | 9 | 6 |
| 217 | 10 | 2 |
| 218 | 4 | 27 |
| 219 | 6 | 19 |
| 220 | 7 | 15 |
| 221 | 8 | 11 |
| 222 | 9 | 7 |
| 223 | 10 | 3 |
| 224 | 4 | 28 |
| 225 | 5 | 24 |
| 226 | 6 | 20 |
| 227 | 7 | 16 |
| 228 | 9 | 8 |
| 229 | 10 | 4 |
| 230 | 11 | 0 |
| 231 | 5 | 25 |
| 232 | 6 | 21 |
| 233 | 7 | 17 |
| 234 | 8 | 13 |
| 235 | 9 | 9 |
| 236 | 10 | 5 |
| 237 | 5 | 26 |
| 238 | 6 | 22 |
| 239 | 7 | 18 |
| 240 | 8 | 14 |
| 241 | 9 | 10 |
| 242 | 10 | 6 |
| 243 | 11 | 2 |
| 244 | 5 | 27 |
| 245 | 6 | 23 |
| 246 | 8 | 15 |
| 247 | 9 | 11 |
| 248 | 10 | 7 |
| 249 | 11 | 3 |
| 250 | 6 | 24 |
| 251 | 7 | 20 |
| 252 | 8 | 16 |
| 253 | 9 | 12 |
| 254 | 10 | 8 |
| 255 | 12 | 0 |

TABLE 4

The number of assignment A-MAPs in each assignment
A-MAP group for FFR configuration.
Group 1 uses QPSK ⅛ in reuse 1, Group 2 uses
QPSK ½ in reuse 1, and Group 3 uses ½ in reuse 3.

| Index | Assignment A-MAP Group 1 Using QPSK ⅛ | Assignment A-MAP Group 2 Using QPSK ½ | Assignment A-MAP Group 3 Using QPSK ½ |
|---|---|---|---|
| 0 | 0 | 0 | 0 |
| 1 | 0 | 0 | 4 |
| 2 | 0 | 4 | 0 |
| 3 | 1 | 0 | 0 |
| 4 | 0 | 0 | 8 |
| 5 | 0 | 4 | 4 |
| 6 | 0 | 8 | 0 |
| 7 | 1 | 0 | 4 |
| 8 | 1 | 4 | 0 |
| 9 | 2 | 0 | 0 |
| 10 | 0 | 0 | 12 |
| 11 | 0 | 4 | 8 |
| 12 | 0 | 8 | 4 |
| 13 | 0 | 12 | 0 |
| 14 | 1 | 0 | 8 |

TABLE 4-continued

The number of assignment A-MAPs in each assignment A-MAP group for FFR configuration.
Group 1 uses QPSK ⅛ in reuse 1, Group 2 uses QPSK ½ in reuse 1, and Group 3 uses ½ in reuse 3.

| Index | Assignment A-MAP Group 1 Using QPSK ⅛ | Assignment A-MAP Group 2 Using QPSK ½ | Assignment A-MAP Group 3 Using QPSK ½ |
|---|---|---|---|
| 15 | 1 | 4 | 4 |
| 16 | 1 | 8 | 0 |
| 17 | 2 | 0 | 4 |
| 18 | 2 | 4 | 0 |
| 19 | 3 | 0 | 0 |
| 20 | 0 | 0 | 16 |
| 21 | 0 | 4 | 12 |
| 22 | 0 | 8 | 8 |
| 23 | 0 | 12 | 4 |
| 24 | 0 | 16 | 0 |
| 25 | 1 | 0 | 12 |
| 26 | 1 | 4 | 8 |
| 27 | 1 | 8 | 4 |
| 28 | 1 | 12 | 0 |
| 29 | 2 | 0 | 8 |
| 30 | 2 | 4 | 4 |
| 31 | 2 | 8 | 0 |
| 32 | 3 | 0 | 4 |
| 33 | 3 | 4 | 0 |
| 34 | 4 | 0 | 0 |
| 35 | 0 | 0 | 20 |
| 36 | 0 | 4 | 16 |
| 37 | 0 | 8 | 12 |
| 38 | 0 | 12 | 8 |
| 39 | 0 | 16 | 4 |
| 40 | 0 | 20 | 0 |
| 41 | 1 | 0 | 16 |
| 42 | 1 | 4 | 12 |
| 43 | 1 | 8 | 8 |
| 44 | 1 | 12 | 4 |
| 45 | 1 | 16 | 0 |
| 46 | 2 | 0 | 12 |
| 47 | 2 | 4 | 8 |
| 48 | 2 | 8 | 4 |
| 49 | 2 | 12 | 0 |
| 50 | 3 | 0 | 8 |
| 51 | 3 | 4 | 4 |
| 52 | 3 | 8 | 0 |
| 53 | 4 | 0 | 4 |
| 54 | 4 | 4 | 0 |
| 55 | 5 | 0 | 0 |
| 56 | 0 | 0 | 24 |
| 57 | 0 | 4 | 20 |
| 58 | 0 | 8 | 16 |
| 59 | 0 | 12 | 12 |
| 60 | 0 | 16 | 8 |
| 61 | 0 | 20 | 4 |
| 62 | 0 | 24 | 0 |
| 63 | 1 | 0 | 20 |
| 64 | 1 | 4 | 16 |
| 65 | 1 | 8 | 12 |
| 66 | 1 | 12 | 8 |
| 67 | 1 | 16 | 4 |
| 68 | 1 | 20 | 0 |
| 69 | 2 | 0 | 16 |
| 70 | 2 | 4 | 12 |
| 71 | 2 | 8 | 8 |
| 72 | 2 | 12 | 4 |
| 73 | 2 | 16 | 0 |
| 74 | 3 | 0 | 12 |
| 75 | 3 | 4 | 8 |
| 76 | 3 | 8 | 4 |
| 77 | 3 | 12 | 0 |
| 78 | 4 | 0 | 8 |
| 79 | 4 | 4 | 4 |
| 80 | 4 | 8 | 0 |
| 81 | 5 | 0 | 4 |
| 82 | 5 | 4 | 0 |
| 83 | 6 | 0 | 0 |
| 84 | 0 | 28 | 0 |
| 85 | 0 | 24 | 4 |
| 86 | 0 | 20 | 8 |
| 87 | 0 | 16 | 12 |
| 88 | 0 | 8 | 20 |
| 89 | 0 | 4 | 24 |
| 90 | 0 | 0 | 28 |
| 91 | 1 | 24 | 0 |
| 92 | 1 | 16 | 8 |
| 93 | 1 | 12 | 12 |
| 94 | 1 | 8 | 16 |
| 95 | 1 | 4 | 20 |
| 96 | 2 | 20 | 0 |
| 97 | 2 | 16 | 4 |
| 98 | 2 | 8 | 12 |
| 99 | 2 | 4 | 16 |
| 100 | 2 | 0 | 20 |
| 101 | 3 | 16 | 0 |
| 102 | 3 | 12 | 4 |
| 103 | 3 | 4 | 12 |
| 104 | 3 | 0 | 16 |
| 105 | 4 | 12 | 0 |
| 106 | 4 | 8 | 4 |
| 107 | 4 | 0 | 12 |
| 108 | 5 | 4 | 4 |
| 109 | 5 | 0 | 8 |
| 110 | 6 | 4 | 0 |
| 111 | 6 | 0 | 4 |
| 112 | 7 | 0 | 0 |
| 113 | 0 | 32 | 0 |
| 114 | 0 | 28 | 4 |
| 115 | 0 | 20 | 12 |
| 116 | 0 | 16 | 16 |
| 117 | 0 | 12 | 20 |
| 118 | 0 | 8 | 24 |
| 119 | 0 | 0 | 32 |
| 120 | 1 | 24 | 4 |
| 121 | 1 | 20 | 8 |
| 122 | 1 | 16 | 12 |
| 123 | 1 | 12 | 16 |
| 124 | 1 | 4 | 24 |
| 125 | 1 | 0 | 28 |
| 126 | 2 | 24 | 0 |
| 127 | 2 | 20 | 4 |
| 128 | 2 | 16 | 8 |
| 129 | 2 | 8 | 16 |
| 130 | 2 | 4 | 20 |
| 131 | 2 | 0 | 24 |
| 132 | 3 | 20 | 0 |
| 133 | 3 | 16 | 4 |
| 134 | 3 | 12 | 8 |
| 135 | 3 | 8 | 12 |
| 136 | 3 | 0 | 20 |
| 137 | 4 | 16 | 0 |
| 138 | 4 | 12 | 4 |
| 139 | 4 | 8 | 8 |
| 140 | 4 | 4 | 12 |
| 141 | 5 | 12 | 0 |
| 142 | 5 | 8 | 4 |
| 143 | 5 | 4 | 8 |
| 144 | 6 | 8 | 0 |
| 145 | 6 | 0 | 8 |
| 146 | 7 | 4 | 0 |
| 147 | 7 | 0 | 4 |
| 148 | 2 | 28 | 0 |
| 149 | 2 | 24 | 4 |
| 150 | 2 | 20 | 8 |
| 151 | 2 | 12 | 16 |
| 152 | 2 | 8 | 20 |

TABLE 4-continued

The number of assignment A-MAPs in each assignment A-MAP group for FFR configuration. Group 1 uses QPSK ⅛ in reuse 1, Group 2 uses QPSK ½ in reuse 1, and Group 3 uses ½ in reuse 3.

| Index | Assignment A-MAP Group 1 Using QPSK ⅛ | Assignment A-MAP Group 2 Using QPSK ½ | Assignment A-MAP Group 3 Using QPSK ½ |
|---|---|---|---|
| 153 | 2 | 4 | 24 |
| 154 | 2 | 0 | 28 |
| 155 | 3 | 20 | 4 |
| 156 | 3 | 16 | 8 |
| 157 | 3 | 12 | 12 |
| 158 | 3 | 8 | 16 |
| 159 | 3 | 0 | 24 |
| 160 | 4 | 20 | 0 |
| 161 | 4 | 12 | 8 |
| 162 | 4 | 8 | 12 |
| 163 | 4 | 4 | 16 |
| 164 | 4 | 0 | 20 |
| 165 | 5 | 16 | 0 |
| 166 | 5 | 8 | 8 |
| 167 | 5 | 4 | 12 |
| 168 | 5 | 0 | 16 |
| 169 | 6 | 12 | 0 |
| 170 | 6 | 4 | 8 |
| 171 | 6 | 0 | 12 |
| 172 | 7 | 8 | 0 |
| 173 | 7 | 4 | 4 |
| 174 | 7 | 0 | 8 |
| 175 | 8 | 4 | 0 |
| 176 | 9 | 0 | 0 |
| 177 | 3 | 24 | 4 |
| 178 | 3 | 20 | 8 |
| 179 | 3 | 16 | 12 |
| 180 | 3 | 12 | 16 |
| 181 | 3 | 4 | 24 |
| 182 | 3 | 0 | 28 |
| 183 | 4 | 24 | 0 |
| 184 | 4 | 20 | 4 |
| 185 | 4 | 12 | 12 |
| 186 | 4 | 8 | 16 |
| 187 | 4 | 4 | 20 |
| 188 | 4 | 0 | 24 |
| 189 | 5 | 20 | 0 |
| 190 | 5 | 16 | 4 |
| 191 | 5 | 12 | 8 |
| 192 | 5 | 4 | 16 |
| 193 | 5 | 0 | 20 |
| 194 | 6 | 16 | 0 |
| 195 | 6 | 12 | 4 |
| 196 | 6 | 8 | 8 |
| 197 | 6 | 4 | 12 |
| 198 | 7 | 12 | 0 |
| 199 | 7 | 8 | 4 |
| 200 | 7 | 4 | 8 |
| 201 | 8 | 8 | 0 |
| 202 | 8 | 0 | 8 |
| 203 | 9 | 4 | 0 |
| 204 | 9 | 0 | 4 |
| 205 | 10 | 0 | 0 |
| 206 | 4 | 28 | 0 |
| 207 | 4 | 24 | 4 |
| 208 | 4 | 16 | 12 |
| 209 | 4 | 12 | 16 |
| 210 | 4 | 8 | 20 |
| 211 | 4 | 4 | 24 |
| 212 | 5 | 20 | 4 |
| 213 | 5 | 16 | 8 |
| 214 | 5 | 12 | 12 |
| 215 | 5 | 8 | 16 |
| 216 | 5 | 0 | 24 |
| 217 | 6 | 20 | 0 |
| 218 | 6 | 12 | 8 |
| 219 | 6 | 8 | 12 |
| 220 | 6 | 4 | 16 |
| 221 | 6 | 0 | 20 |
| 222 | 7 | 16 | 0 |
| 223 | 7 | 8 | 8 |
| 224 | 7 | 4 | 12 |
| 225 | 7 | 0 | 16 |
| 226 | 8 | 8 | 4 |
| 227 | 8 | 4 | 8 |
| 228 | 8 | 0 | 12 |
| 229 | 9 | 8 | 0 |
| 230 | 9 | 4 | 4 |
| 231 | 9 | 0 | 8 |
| 232 | 10 | 0 | 4 |
| 233 | 11 | 0 | 0 |
| 234 | 6 | 24 | 0 |
| 235 | 6 | 20 | 4 |
| 236 | 6 | 16 | 8 |
| 237 | 6 | 12 | 12 |
| 238 | 6 | 4 | 20 |
| 239 | 6 | 0 | 24 |
| 240 | 7 | 16 | 4 |
| 241 | 7 | 12 | 8 |
| 242 | 7 | 8 | 12 |
| 243 | 7 | 4 | 16 |
| 244 | 8 | 12 | 4 |
| 245 | 8 | 8 | 8 |
| 246 | 8 | 4 | 12 |
| 247 | 8 | 0 | 16 |
| 248 | 9 | 12 | 0 |
| 249 | 9 | 8 | 4 |
| 250 | 9 | 4 | 8 |
| 251 | 9 | 0 | 12 |
| 252 | 10 | 8 | 0 |
| 253 | 10 | 4 | 4 |
| 254 | 11 | 0 | 4 |
| 255 | 12 | 0 | 0 |

TABLE 5

The number of assignment A-MAPs in each assignment A-MAP group for FFR configuration. Group 1 uses QPSK ¼ in reuse 1, Group 2 uses QPSK ½ in reuse 1, and Group 3 uses QPSK ½ in reuse 3.

| Index | Assignment A-MAP Group 1 Using QPSK ¼ | Assignment A-MAP Group 2 Using QPSK ½ | Assignment A-MAP Group 3 Using QPSK ½ |
|---|---|---|---|
| 0 | 0 | 0 | 0 |
| 1 | 1 | 0 | 0 |
| 2 | 2 | 0 | 0 |
| 3 | 0 | 0 | 5 |
| 4 | 0 | 5 | 0 |
| 5 | 3 | 0 | 0 |
| 6 | 1 | 0 | 5 |
| 7 | 1 | 5 | 0 |
| 8 | 4 | 0 | 0 |
| 9 | 2 | 0 | 5 |
| 10 | 2 | 5 | 0 |
| 11 | 0 | 0 | 10 |
| 12 | 0 | 5 | 5 |
| 13 | 0 | 10 | 0 |
| 14 | 5 | 0 | 0 |
| 15 | 3 | 0 | 5 |
| 16 | 3 | 5 | 0 |

TABLE 5-continued

The number of assignment A-MAPs in each assignment A-MAP group for FFR configuration. Group 1 uses QPSK ¼ in reuse 1, Group 2 uses QPSK ½ in reuse 1, and Group 3 uses QPSK ½ in reuse 3.

| Index | Assignment A-MAP Group 1 Using QPSK ¼ | Assignment A-MAP Group 2 Using QPSK ½ | Assignment A-MAP Group 3 Using QPSK ½ |
|---|---|---|---|
| 17 | 1 | 0 | 10 |
| 18 | 1 | 5 | 5 |
| 19 | 1 | 10 | 0 |
| 20 | 6 | 0 | 0 |
| 21 | 4 | 0 | 5 |
| 22 | 4 | 5 | 0 |
| 23 | 2 | 0 | 10 |
| 24 | 2 | 5 | 5 |
| 25 | 2 | 10 | 0 |
| 26 | 7 | 0 | 0 |
| 27 | 0 | 0 | 15 |
| 28 | 0 | 5 | 10 |
| 29 | 0 | 10 | 5 |
| 30 | 0 | 15 | 0 |
| 31 | 5 | 0 | 5 |
| 32 | 5 | 5 | 0 |
| 33 | 3 | 0 | 10 |
| 34 | 3 | 5 | 5 |
| 35 | 3 | 10 | 0 |
| 36 | 8 | 0 | 0 |
| 37 | 1 | 0 | 15 |
| 38 | 1 | 5 | 10 |
| 39 | 1 | 10 | 5 |
| 40 | 1 | 15 | 0 |
| 41 | 6 | 0 | 5 |
| 42 | 6 | 5 | 0 |
| 43 | 4 | 0 | 10 |
| 44 | 4 | 5 | 5 |
| 45 | 4 | 10 | 0 |
| 46 | 9 | 0 | 0 |
| 47 | 2 | 0 | 15 |
| 48 | 2 | 5 | 10 |
| 49 | 2 | 10 | 5 |
| 50 | 2 | 15 | 0 |
| 51 | 7 | 0 | 5 |
| 52 | 7 | 5 | 0 |
| 53 | 0 | 0 | 20 |
| 54 | 0 | 5 | 15 |
| 55 | 0 | 10 | 10 |
| 56 | 0 | 15 | 5 |
| 57 | 0 | 20 | 0 |
| 58 | 5 | 0 | 10 |
| 59 | 5 | 5 | 5 |
| 60 | 5 | 10 | 0 |
| 61 | 10 | 0 | 0 |
| 62 | 3 | 0 | 15 |
| 63 | 3 | 5 | 10 |
| 64 | 3 | 10 | 5 |
| 65 | 3 | 15 | 0 |
| 66 | 8 | 0 | 5 |
| 67 | 8 | 5 | 0 |
| 68 | 1 | 0 | 20 |
| 69 | 1 | 5 | 15 |
| 70 | 1 | 10 | 10 |
| 71 | 1 | 15 | 5 |
| 72 | 1 | 20 | 0 |
| 73 | 6 | 0 | 10 |
| 74 | 6 | 5 | 5 |
| 75 | 6 | 10 | 0 |
| 76 | 11 | 0 | 0 |
| 77 | 4 | 0 | 15 |
| 78 | 4 | 5 | 10 |
| 79 | 4 | 10 | 5 |
| 80 | 4 | 15 | 0 |
| 81 | 9 | 0 | 5 |
| 82 | 9 | 5 | 0 |
| 83 | 2 | 0 | 20 |
| 84 | 2 | 5 | 15 |
| 85 | 2 | 10 | 10 |
| 86 | 2 | 15 | 5 |
| 87 | 2 | 20 | 0 |
| 88 | 7 | 0 | 10 |
| 89 | 7 | 5 | 5 |
| 90 | 7 | 10 | 0 |
| 91 | 12 | 0 | 0 |
| 92 | 0 | 20 | 5 |
| 93 | 0 | 15 | 10 |
| 94 | 0 | 5 | 20 |
| 95 | 0 | 0 | 25 |
| 96 | 5 | 15 | 0 |
| 97 | 5 | 5 | 10 |
| 98 | 5 | 0 | 15 |
| 99 | 10 | 0 | 5 |
| 100 | 3 | 20 | 0 |
| 101 | 3 | 15 | 5 |
| 102 | 3 | 5 | 15 |
| 103 | 3 | 0 | 20 |
| 104 | 8 | 10 | 0 |
| 105 | 8 | 0 | 10 |
| 106 | 13 | 0 | 0 |
| 107 | 1 | 25 | 0 |
| 108 | 1 | 20 | 5 |
| 109 | 1 | 10 | 15 |
| 110 | 1 | 5 | 20 |
| 111 | 6 | 10 | 5 |
| 112 | 6 | 5 | 10 |
| 113 | 11 | 5 | 0 |
| 114 | 11 | 0 | 5 |
| 115 | 4 | 15 | 5 |
| 116 | 4 | 10 | 10 |
| 117 | 4 | 0 | 20 |
| 118 | 9 | 5 | 5 |
| 119 | 9 | 0 | 10 |
| 120 | 14 | 0 | 0 |
| 121 | 2 | 25 | 0 |
| 122 | 2 | 15 | 10 |
| 123 | 2 | 10 | 15 |
| 124 | 2 | 0 | 25 |
| 125 | 7 | 15 | 0 |
| 126 | 7 | 10 | 5 |
| 127 | 7 | 0 | 15 |
| 128 | 12 | 0 | 5 |
| 129 | 0 | 30 | 0 |
| 130 | 0 | 20 | 10 |
| 131 | 0 | 15 | 15 |
| 132 | 0 | 5 | 25 |
| 133 | 0 | 0 | 30 |
| 134 | 5 | 15 | 5 |
| 135 | 5 | 10 | 10 |
| 136 | 5 | 0 | 20 |
| 137 | 10 | 10 | 0 |
| 138 | 10 | 5 | 5 |
| 139 | 10 | 0 | 10 |
| 140 | 3 | 20 | 5 |
| 141 | 3 | 15 | 10 |
| 142 | 3 | 5 | 20 |
| 143 | 3 | 0 | 25 |
| 144 | 8 | 15 | 0 |
| 145 | 8 | 5 | 10 |
| 146 | 8 | 0 | 15 |
| 147 | 13 | 0 | 5 |
| 148 | 1 | 25 | 5 |
| 149 | 1 | 20 | 10 |
| 150 | 1 | 10 | 20 |
| 151 | 1 | 5 | 25 |
| 152 | 1 | 0 | 30 |

TABLE 5-continued

The number of assignment A-MAPs in each assignment A-MAP group for FFR configuration. Group 1 uses QPSK ¼ in reuse 1, Group 2 uses QPSK ½ in reuse 1, and Group 3 uses QPSK ½ in reuse 3.

| Index | Assignment A-MAP Group 1 Using QPSK ¼ | Assignment A-MAP Group 2 Using QPSK ½ | Assignment A-MAP Group 3 Using QPSK ½ |
|---|---|---|---|
| 153 | 6 | 20 | 0 |
| 154 | 6 | 15 | 5 |
| 155 | 6 | 5 | 15 |
| 156 | 6 | 0 | 20 |
| 157 | 11 | 10 | 0 |
| 158 | 11 | 5 | 5 |
| 159 | 4 | 25 | 0 |
| 160 | 4 | 20 | 5 |
| 161 | 4 | 15 | 10 |
| 162 | 4 | 5 | 20 |
| 163 | 4 | 0 | 25 |
| 164 | 9 | 10 | 5 |
| 165 | 9 | 5 | 10 |
| 166 | 14 | 5 | 0 |
| 167 | 14 | 0 | 5 |
| 168 | 2 | 25 | 5 |
| 169 | 2 | 20 | 10 |
| 170 | 2 | 10 | 20 |
| 171 | 2 | 5 | 25 |
| 172 | 7 | 20 | 0 |
| 173 | 7 | 10 | 10 |
| 174 | 7 | 5 | 15 |
| 175 | 7 | 0 | 20 |
| 176 | 12 | 10 | 0 |
| 177 | 12 | 0 | 10 |
| 178 | 17 | 0 | 0 |
| 179 | 5 | 25 | 0 |
| 180 | 5 | 20 | 5 |
| 181 | 5 | 10 | 15 |
| 182 | 5 | 5 | 20 |
| 183 | 10 | 15 | 0 |
| 184 | 10 | 10 | 5 |
| 185 | 10 | 5 | 10 |
| 186 | 15 | 5 | 0 |
| 187 | 8 | 15 | 5 |
| 188 | 8 | 10 | 10 |
| 189 | 8 | 0 | 20 |
| 190 | 13 | 5 | 5 |
| 191 | 13 | 0 | 10 |
| 192 | 18 | 0 | 0 |
| 193 | 6 | 25 | 0 |
| 194 | 6 | 15 | 10 |
| 195 | 6 | 10 | 15 |
| 196 | 6 | 0 | 25 |
| 197 | 11 | 15 | 0 |
| 198 | 11 | 5 | 10 |
| 199 | 11 | 0 | 15 |
| 200 | 16 | 0 | 5 |
| 201 | 9 | 20 | 0 |
| 202 | 9 | 15 | 5 |
| 203 | 9 | 5 | 15 |
| 204 | 9 | 0 | 20 |
| 205 | 14 | 10 | 0 |
| 206 | 14 | 5 | 5 |
| 207 | 7 | 25 | 0 |
| 208 | 7 | 20 | 5 |
| 209 | 7 | 10 | 15 |
| 210 | 7 | 5 | 20 |
| 211 | 7 | 0 | 25 |
| 212 | 12 | 10 | 5 |
| 213 | 12 | 5 | 10 |
| 214 | 17 | 5 | 0 |
| 215 | 17 | 0 | 5 |
| 216 | 10 | 20 | 0 |
| 217 | 10 | 10 | 10 |
| 218 | 10 | 5 | 15 |
| 219 | 15 | 5 | 5 |
| 220 | 15 | 0 | 10 |
| 221 | 20 | 0 | 0 |
| 222 | 13 | 15 | 0 |
| 223 | 13 | 10 | 5 |
| 224 | 13 | 0 | 15 |
| 225 | 18 | 5 | 0 |
| 226 | 11 | 15 | 5 |
| 227 | 11 | 10 | 10 |
| 228 | 11 | 0 | 20 |
| 229 | 16 | 5 | 5 |
| 230 | 16 | 0 | 10 |
| 231 | 21 | 0 | 0 |
| 232 | 14 | 15 | 0 |
| 233 | 14 | 5 | 10 |
| 234 | 14 | 0 | 15 |
| 235 | 19 | 0 | 5 |
| 236 | 12 | 20 | 0 |
| 237 | 12 | 15 | 5 |
| 238 | 12 | 5 | 15 |
| 239 | 12 | 0 | 20 |
| 240 | 17 | 10 | 0 |
| 241 | 17 | 5 | 5 |
| 242 | 15 | 10 | 5 |
| 243 | 15 | 5 | 10 |
| 244 | 15 | 0 | 15 |
| 245 | 20 | 5 | 0 |
| 246 | 20 | 0 | 5 |
| 247 | 18 | 10 | 0 |
| 248 | 18 | 5 | 5 |
| 249 | 16 | 15 | 0 |
| 250 | 16 | 5 | 10 |
| 251 | 16 | 0 | 15 |
| 252 | 21 | 0 | 5 |
| 253 | 19 | 5 | 5 |
| 254 | 19 | 0 | 10 |
| 255 | 24 | 0 | 0 |

Figure 2:
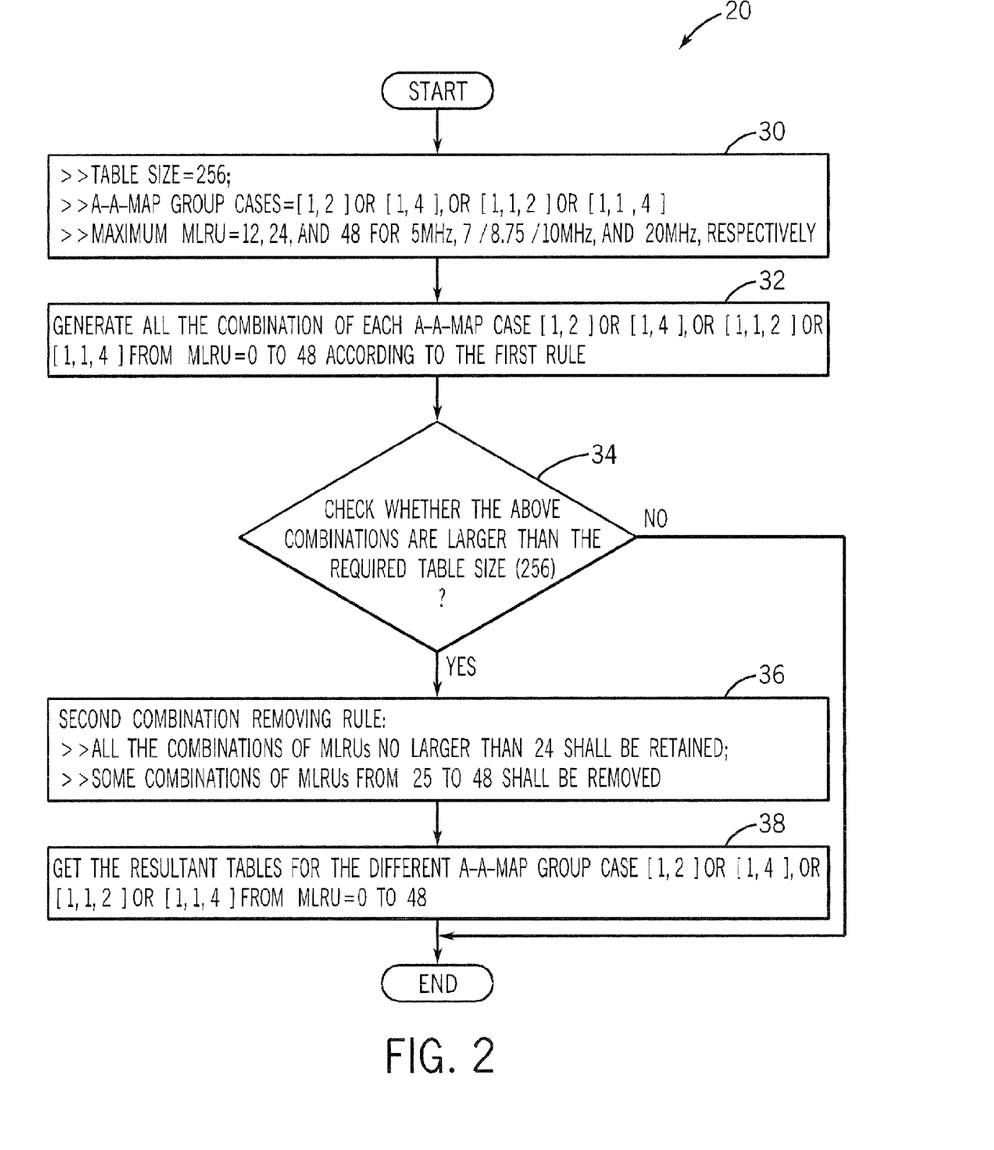
FIG. 2 is a flow chart for the embodiment shown in FIG. 1 in accordance with one embodiment.

Referring to FIG. 2, a sequence 20 may be implemented in software, firmware, or hardware. In software implemented embodiments, the sequence 20 may be implemented by instructions stored in a computer readable medium such as a semiconductor, optical, or magnetic memory. Those instructions may be executed by a controller or processor. Thus, for example, the instructions to make up the sequence 20 may be stored in the storage 18 of the base station 12, as illustrated in FIG. 1, in one embodiment. Then those instructions may be executed by the controller 16.

Still referring to FIG. 2, initially, at block 30, the table size is set equal to 256. The AA-MAP group cases are set equal to [1, 2] MLRUs for case 1, [1, 4] MLRUs for case 2, [1, 1, 2] MLRUs for case 3, and [1, 1, 4] MLRUs for case 4. The maximum MLRU for each of the group cases is 12, 24, and 48 for 5 MHz, 7/8.75/10 MHz, and 20 MHz, respectively.

Then, in block 32, all combinations of all A-A-MAP cases are generated from MLRU equals to zero to 48, according to the first rule for each of the four cases. Namely, in case 1, non-FFR A-A-MAP using QPSK {½, ¼}, the first rule is $N_1$ may be [0:1:24] and $N_2$ may be [0:1:48]. In case 2, non-FFR A-A-MAP using QPSK {½, ⅛}, the first rule is $N_1$ may be [0:1:12] and $N_2$ may be [0:1:48]. In case 3, FFR reuse of 3 A-A-MAP groups using QPSK {½} and FFR reuse of 1 A-A-MAP group using QPSK {½, ⅛}, the first rule is $N_1$ may be [0:1:12] and $N_2$ may be [0:4:48] and $N_3$ may be [0:4:48]. In case 4, FFR reuse of 3 A-A-MAP groups, using QPSK {½} and for reuse of 1 A-A-MAP group using QPSK {½, ¼}, $N_1$ may be [0:1:24], $N_2$ may be [0:5:48] and $N_3$ may be [0:5:48].

Then, in diamond 34, a check determines whether the above determined combinations are greater than the required table size of 256. If not, the operation is completed.

Otherwise, in block 36, the second combination removing rule is applied. Namely, all the combinations of MLRUs no larger than 24 are retained and some combinations of MLRUs from 25 to 48 shall be removed.

Finally, in block 38, the results in tables are obtained for the different AA-MAP group cases from MLRU zero to 48.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   signaling control information to a station;
   using a table to indicate the site of a group based on coding rate;
   determining said size using only unoccupied resources in groups that are adjacent in a frequency domain to a data resource;
   segregating cases using fractional frequency reuse and cases not using fractional frequency reuse;
   segregating the cases not using fractional frequency reuse into first and second cases using different coding rates; and
   dividing the fractional frequency reuse cases into a third case using a first coding rate for fractional frequency reuse of three assignment-advanced-MAP (A-A-MAP) groups and second and third coding rate for reuse of one A-A-MAP group.

2. The method of claim 1 including limiting the table size.

3. The method of claim 2 including determining whether a number of combinations is larger than the table size.

4. The method of claim 1 further including dividing the fractional frequency reuse cases into a fourth case using fractional frequency reuse of three groups for a first coding rate and reuse of one group for second and third coding rates.

5. The method of claim 4 including limiting the total number of logical resource units for a given case to below a particular number of units for each of said first, second, third, and fourth cases.

6. The method of claim 5 including limiting the number of logical resource units for each group in each case.

7. The method of claim 6 including limiting the number of logical resource units to one and two for the first case, one and four for the second case, one, one, and two for the third case, and one, one, and four for the fourth case.

8. A non-transitory computer readable medium storing instructions executed by a computer to:
   send control information to a mobile station by indicating the size of a group based on a coding rate;
   determine said size on the basis that an occupied resource in a group that is adjacent to data resource may be used for data transmission by the station;
   use only unoccupied resource in groups that are adjacent in a frequency domain to a data resource;
   separate the control information into cases using fractional frequency reuse and cases not using fractional frequency reuse;
   segregate the cases not using fractional frequency reuse into first and second cases using different coding rates; and
   divide the fractional frequency reuse cases into a third case using a first coding rate for fractional frequency reuse of three A-A-MAP groups and second and third coding rate for reuse of one A-A-MAP group.

9. The medium of claim 8 further storing instructions to use a table to indicate the size of the group.

10. The medium of claim 9 further storing instructions to limit the table size.

11. The medium of claim 10 further storing instructions to determine whether a number of combinations is larger than the table size.

12. The medium of claim 8 further storing instructions to divide the fractional frequency reuse cases into a fourth case using fractional frequency reuse of three groups for a first coding rate and reuse of one group for second and third coding rates.

13. The medium of claim 12 further storing instructions to limit the total number of logical resource units for a given case to below a particular number of units for each of the first, second, third, and fourth cases.

14. The medium of claim 13 further storing instructions to limit the number of logical resource units for each group in each case, and to limit the number of logical resource units to one and two for the first case, one and four for the second case, one, one, and two for the third case, and one, one, and four for the fourth case.

15. A base station comprising:
    a transceiver;
    a controller coupled to said transceiver; and
    said station to send control information to a mobile station to indicate the size of the group based on coding rate and to determine said size by using only unoccupied resources in groups that are adjacent in a frequency domain to a data resource, said station to develop tables to indicate the size of the group by dividing the cases into those using fractional frequency reuse and those not using fractional frequency reuse, said station further to segregate the cases not using fractional frequency reuse into first and second cases using different coding rates, and divide the fractional frequency reuse cases into a third case using a first coding rate for fractional frequency reuse of three assignment-advanced-MAP groups and a second and third coding rate for reuse of one assignment-advanced-MAP group and a fourth case using fractional frequency reuse of three groups for a first coding rate and reuse of one group for second and third coding rates.

16. The station of claim 15, said storage storing instructions to limit the table size to 256.

* * * * *